Sept. 7, 1948.  T. I. RESS ET AL  2,448,912
OVERRUNNING CLUTCH
Filed Jan. 12, 1945
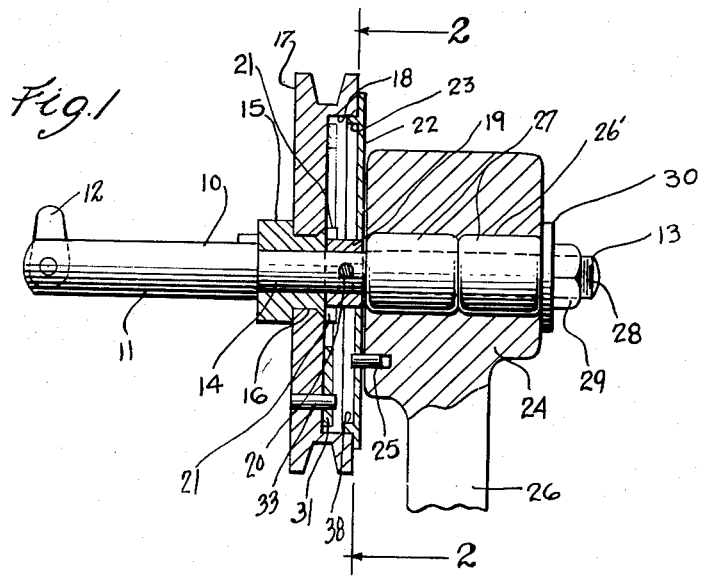
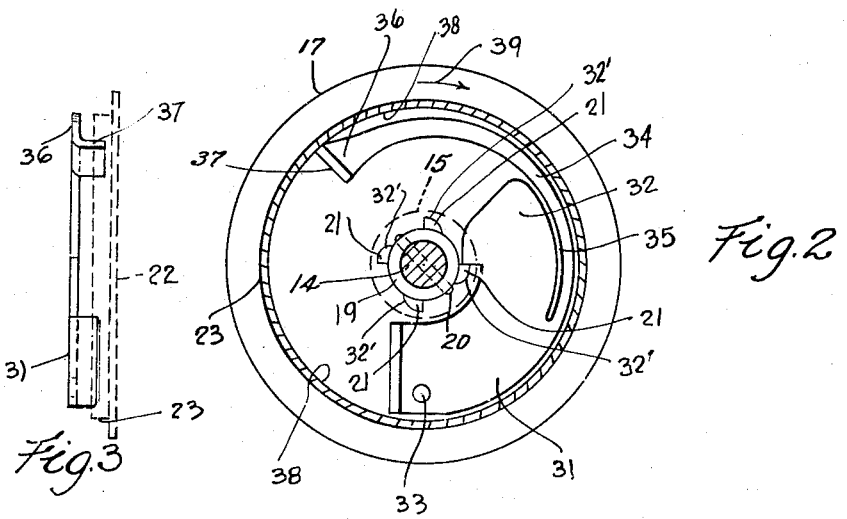
INVENTOR.
John W. Lang Jr. &
Thomas I. Ress
BY
Their Att Patented Sept. 7, 1948

2,448,912

UNITED STATES PATENT OFFICE 2,448,912

OVERRUNNING CLUTCH

Thomas I. Ress and John W. Lang, Jr., Chicago, Ill., assignors to De Vry Corporation, Chicago, Ill., a corporation of Illinois Application January 12, 1945, Serial No. 572,479

4 Claims. (Cl. 192—41)

This invention relates to certain new and useful improvements in overrunning clutches. More specifically, the invention relates to a simple and effective feed reel coupling, and has for its principal object the provision of an improved construction which will be highly efficient in use and economical in manufacture.

The invention contemplates to provide a spindle construction whereby the feed reel of the motion picture projecting apparatus will have positive drive connection for rewind rotation while being capable of rotation independently of the movement of its driving means to allow feeding of the film into the projector without placing undue strain upon the film during this feeding operation.

Ancillary to the foregoing object is to provide a mechanism of the character hereinafter described, which is automatic in its operation, thereby eliminating the necessity of employing a manually operated clutch to permit the performance of the feeding of the film into the projector and to provide a mechanism capable of the foregoing functions, which will reduce to a minimum the strain otherwise transmitted to the film during this operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary sectional detail view of a film reel spindle showing the improvements constituting the subject matter of this invention incorporated therein;

Fig. 2 is a sectional detail view taken substantially on line 2—2 of Fig. 1;

Fig. 3 is an edge elevational view of the latch element embodied in the invention.

The drawings disclose the preferred form of construction by which the several objects of my invention are accomplished. In this connection the spindle shaft is indicated at 10, the end portion 11 of which has associated therewith the usual pivoted latch finger 12 for releasably latching the film reel upon this end portion 11 of the shaft in a manner well understood in the art. The opposite end portion 13 of this shaft 10 is slightly reduced as at 14 and mounted thereon is a suitable bushing 15 reduced as at 16 to receive the drive pulley 17 operatively connected to the driving mechanism of the motion picture projecting apparatus in a manner likewise well understood in the art. The bushing 15 and pulley 17 are connected together for simultaneous rotation. Adjacent the bushing 15 and within a hollow recess 18 of the pulley 17 is mounted a sleeve 19 fixedly connected to the shaft portion 13 by a pin 20. This sleeve 19 has formed thereon at predetermined points lugs 21.

A face plate 22 is provided and constitutes a wall closing the recess 18, and this face plate has an annular, laterally extending projection 23 formed thereon loosely fitting within the recess 18 and constituting a drum. This face plate 22 is pinned to a bearing 24 as at 25. This bearing 24 is formed as an integral part of the bearing arm 26 which serves to support the spindle structure in its operative relation with respect to the other mechanism (not shown) of the motion picture projecting apparatus. Arranged within the bore 26' of this bearing head 24 are suitable bearings 27 of any well-known construction, and journaled through these bearings 27 is the end portion 13 of the shaft 10.

This end portion 13 of the shaft 10 is threaded as at 28 and has threaded thereon a connecting nut 29 bearing against a suitable washer 30.

Positioned in the recess 18 is a latch element 31 providing a latch head 32. This latch element is connected to the pulley 17 by means of a pin 33, the connection as shown being offset with respect to the axis of the pulley whereby the latch element 31 (which in plan view is substantially semi-circular) may be pivoted relative to the axis of the pulley for reasons hereinafter set forth. Extending from this latch element 31 is a drag arm 34. This drag arm 34 is formed as an integral part of the latch element 31, and this drag arm is severed partially from the latch element 31 by a saw kerf 35, the object being to provide radial resiliency of the drag arm 34. The end 36 of this drag arm is provided with a head 37 which is adapted to have dragging engagement with the inside surface 38 of the drum 23, as best illustrated in Figs. 2 and 3.

During the rewinding of the film upon the film reel (not shown) mounted upon the end portion 11 of the spindle shaft 10, there will be by virtue of the foregoing construction a positive connection between the pulley 17 and the spindle shaft 10, which connection will continue as long as the pulley is rotated in film rewinding direction, which direction is indicated by the arrow 39 (Fig. 2). This results from the fact that the drag head 37 (which rotates with the pulley 17) dragging upon the stationary drum 23, will effect a pivotal movement of the latch element 31 in a direction about its pivot 33 to dispose the latch head 32 in engagement with one of the lugs 21, as best shown in Fig. 2.

When the driving means which drives the pulley 17 in the rewinding operation is discontinued at the conclusion of such rewinding operation, the relative movement between the pulley 17 and the shaft 10 resulting from the inertia movement of the spindle shaft 10 and the film reel, will effect bearing engagement between the beveled portions 32' of the lugs 21 and the latch head 32, effecting a pivotal movement of the latch element 31 in a direction to unlatch the latch head 32 from the lug 21 with which it is engaged, thereby freeing the pulley from connection with the spindle shaft 10. In this freed condition the film reel may be freely rotated to facilitate feeding of the film through the projector without disposing undue strain upon the film.

It will be obvious from the foregoing that during the rewinding operation a positive connection is automatically effected between the pulley 17 and the spindle shaft 10, yet the relative movement between the pulley 17 and the spindle shaft 10 caused by the inertia movement of the spindle shaft 10 and the film reel carried thereby, instantaneously disengages the spindle shaft 10 from the pulley 17 to free the spindle shaft 10 and the film carried thereby for feeding of the film through the projector.

The effectiveness and simplicity of the invention as viewed in both forms of construction at once becomes obvious from the foregoing description read in connection with the accompanying drawings.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In combination, a stationary bearing, a shaft having an end portion rotatably journalled in said bearing, a pulley mounted on said shaft for free rotation with respect thereto, a latch member pivotally carried by the pulley for rotation therewith and having a drag arm, a member fixed to the bearing and having a portion thereof adapted to have dragging engagement with respect to said drag arm when said pulley is rotated in one direction, and means on said shaft and rotatable therewith and adapted for latched engagement with said latch member when said latch member is pivoted in a direction opposite to the rotation of the pulley in said one direction to provide together with said latch member a connection between the shaft and said pulley, said means being adapted to pivot said latch member in an opposite direction to the aforesaid pivotal movement of said latch member by the inertia of said shaft when said pulley becomes inert, to disengage the latched connection between said means and said latch member to permit free rotation of the pulley relative to the shaft.

2. In combination, a stationary bearing, a shaft having an end portion rotatably journalled in said bearing, a pulley mounted on said shaft for free rotation with respect thereto, a latch member pivotally carried by the pulley for rotation therewith and having a resilient drag arm, a drumlike member fixed to the bearing and having a flange portion thereof adapted to have dragging engagement with respect to said drag arm when said pulley is rotated in one direction, and means on said shaft and rotatable therewith and adapted for latched engagement with said latch member when said latch member is pivoted in a direction opposite to the rotation of the pulley in said one direction to provide together with said latch member a connection between the shaft and said pulley, said means being adapted to pivot said latch member in an opposite direction to the aforesaid pivotal movement of said latch member by the inertia of said shaft when said pulley becomes inert, to disengage the latched connection between said means and said latch member to permit free rotation of the pulley relative to the shaft.

3. In combination, a stationary bearing, a shaft having an end portion rotatably journalled in said bearing, a pulley mounted on said shaft for free rotation with respect thereto, a latch member pivotally carried by the pulley for rotation therewith and having a drag arm, a member fixed to the bearing and having a portion thereof adapted to have dragging engagement with respect to said drag arm when said pulley is rotated in one direction, and means on said shaft and rotatable therewith and adapted for latched engagement with said latch member when said latch member is pivoted in a direction opposite to the rotation of the pulley in said one direction to provide together with said latch member a connection between the shaft and said pulley, said means being adapted to pivot said latch member in an opposite direction to the aforesaid pivotal movement of said latch member by the inertia of said shaft when said pulley becomes inert, to disengage the latched connection between said means and said latch member to permit free rotation of the pulley relative to the shaft, said means comprising a sleeve fixed to said shaft and having a plurality of radially disposed lugs disposed to engage said latch member upon rotation of said shaft relative to said pulley and each of said lugs having corresponding portions tapered for camming engagement with respect to said latch member.

4. In combination, a stationary bearing, a shaft having an end portion rotatably journalled in said bearing, a pulley mounted on said shaft for free rotation with respect thereto, a latch member pivotally carried by the pulley for rotation therewith and having a resilient drag arm, a drumlike member fixed to the bearing and having a flange portion thereof adapted to have dragging engagement with respect to said drag arm when said pulley is rotated in one direction, and means on said shaft and rotatable therewith and adapted for latched engagement with said latch member when said latch member is pivoted in a direction opposite to the rotation of the pulley in said one direction to provide together with said latch member a connection between the shaft and said pulley, said means being adapted to pivot said latch member in an opposite direction to the aforesaid pivotal movement of said latch member by the inertia of said shaft when said pulley becomes inert, to disengage the latched connection between said means and said latch member to permit free rotation of the pulley relative to the shaft, said means comprising a sleeve fixed to said shaft and having a plurality of radially disposed lugs disposed to engage said latch member upon rotation of said shaft relative to said pulley and each of said lugs having corresponding portions tapered for camming engagement with respect to said latch member.

THOMAS I. RESS.
JOHN W. LANG, Jr.

REFERENCES CITED

The following references are of record in the file of this patent:

UNITED STATES PATENTS

| Number | Name | Date |
|---|---|---|
| 1,861,584 | Readeker et al. | June 7, 1932 |